(12) United States Patent
Murakami et al.

(10) Patent No.: US 7,141,631 B2
(45) Date of Patent: Nov. 28, 2006

(54) NON-CONJUGATED CYCLIC DIENE, NON-CONJUGATED CYCLIC DIENE COMPOSITION AND METHOD OF PRODUCING POLYMER BASED ON NON-CONJUGATED CYCLIC DIENE

(75) Inventors: Toshio Murakami, Wakicho (JP); Hidetatsu Murakami, Sodegaura (JP); Yasuhiro Takano, Wakicho (JP); Kenji Doi, Wakicho (JP); Akira Kumagae, Wakicho (JP); Yasuhiro Hasada, Wakicho (JP); Toshizi Nishimura, Wakicho (JP)

(73) Assignee: Mitsui Chemicals, Inc., Tokyo (JP)

( * ) Notice: Subject to any disclaimer, the term of this patent is extended or adjusted under 35 U.S.C. 154(b) by 82 days.

(21) Appl. No.: 10/980,283

(22) Filed: Nov. 4, 2004

(65) Prior Publication Data
US 2005/0131182 A1    Jun. 16, 2005

(30) Foreign Application Priority Data

| Nov. 10, 2003 | (JP) | ............................. 2003-380022 |
| Nov. 13, 2003 | (JP) | ............................. 2003-383663 |
| Apr. 1, 2004 | (JP) | ............................. 2004-109193 |

(51) Int. Cl.
*C08F 36/20* (2006.01)
*C07C 13/28* (2006.01)

(52) U.S. Cl. .................... 526/77; 526/282; 585/23; 585/820; 585/831; 252/399; 524/856

(58) Field of Classification Search ................ 526/77, 526/282; 585/827, 23, 820, 831; 252/399; 524/856
See application file for complete search history.

(56) References Cited

U.S. PATENT DOCUMENTS

| 4,748,216 A | * | 5/1988 | Tom | ............................. 526/77 |
| 5,155,188 A | * | 10/1992 | Goodall | ...................... 526/165 |
| 5,378,783 A | * | 1/1995 | Okumura et al. | ........... 526/283 |

FOREIGN PATENT DOCUMENTS

| JP | 01-096140 A | 4/1989 |
| JP | 2000-204120 A | 7/2000 |

OTHER PUBLICATIONS

Esp@cenet database abstract of JP 324070, publication date: Oct. 28, 1991.*
English language translation of JP 2000-204120, published Jul. 25, 2000.*

* cited by examiner

*Primary Examiner*—Fred Teskin
(74) *Attorney, Agent, or Firm*—Buchanan Ingersoll & Rooney PC

(57) ABSTRACT

It is an object of the present invention to provide a non-conjugated cyclic diene and a non-conjugated cyclic diene composition which enable the production of a polymer based on non-conjugated cyclic diene which makes it possible to produce a (co)polymer at a high degree of polymerization activity, and a method of producing a polymer based on non-conjugated cyclic diene which makes it possible to produce a (co)polymer at a high degree of polymerization activity. A non-conjugated cyclic diene is used which meets at least one of the following requirements: (1) it contains a compound having a seven-membered cyclic triene hydrocarbon structure in a specific amount or less and (2) it contains a conjugated polyene compound having an eight-membered bicyclic hydrocarbon structure in a specific amount. Also, in a method of producing a non-conjugated cyclic diene polymer, the aforementioned non-conjugated cyclic diene is supplied to the polymerization or copolymerization using an olefin polymerization catalyst containing an organic aluminum oxy compound and/or an ionizing ionic compound. Also, in another method of producing a non-conjugated cyclic diene polymer, a non-conjugated cyclic diene which is obtained by bringing a crude non-conjugated cyclic diene into contact with an alkali and then removing at least a part of a low-boiling point fraction and at least a part of a high-boiling point fraction is used for the polymerization.

6 Claims, No Drawings

NON-CONJUGATED CYCLIC DIENE, NON-CONJUGATED CYCLIC DIENE COMPOSITION AND METHOD OF PRODUCING POLYMER BASED ON NON-CONJUGATED CYCLIC DIENE

BACKGROUND OF THE INVENTION

1. Field of the Invention

The present invention relates to a non-conjugated cyclic diene, a non-conjugated cyclic diene composition and a method of producing a polymer based on non-conjugated cyclic diene.

2. Description of the Related Art

Polymers based on non-conjugated cyclic diene such as ethylene/propylene/ethylidene norbornene copolymers are those which are vulcanizable, are superior in weatherability, heat resistance and ozone resistance and are used for automobile industrial parts, industrial rubber products, insulating materials, civil and construction materials and rubber products such as gummed clothes and also widely used for materials to be blended with plastics such as a polypropylene and polystyrene. In the case of manufacturing such a polymer based on non-conjugated cyclic diene, there is the case where polymerization activity is low though this depends on manufacturing conditions such as catalysts. Therefore it has been desired to develop a method of producing a polymer based on non-conjugated cyclic diene at a high degree of polymerization activity.

Under this situation, the applicant of this case has proposed a method using norbornene or its derivative which are brought into contact with alumina or norbornene or its derivative which are brought into contact with an aqueous alkali as a raw monomer when manufacturing a polymer based on non-conjugated cyclic diene by using a metallocene type catalyst (see JP-A No. 2000-204120).

A refining method is proposed in which when dicyclopentadiene is used in reaction-injection molding, it is brought into contact with an alkali material, followed by washing with water and dewatering (see JP-A No. 01-096410). However, in the method described there, a polymer cannot be obtained at a high degree of activity when polymerizing or copolymerizing a non-conjugated cyclic diene by using a specific catalyst system such as a metallocene type catalyst.

The inventors of the present invention have made further studies, and as a result, found that a specific component contained in a non-conjugated cyclic diene inhibits polymerization when a specific catalyst component such as an organic aluminum oxy compound and/or ionizing ionic compound is used to polymerize or copolymerize a non-conjugated cyclic diene, and when a non-conjugated cyclic diene reduced in the amount of that component to lower than a specific level is used, the activity of polymerization is significantly increased in the polymerization and copolymerization of the non-conjugated cyclic diene by using a specific catalyst component containing an organic aluminum oxy compound and/or ionizing ionic compound, to complete the present invention.

The inventors have also found that when using a non-conjugated cyclic diene obtained by a specific method in which a crude non-conjugated cyclic diene is brought into contact with an alkali and then a low-boiling point fraction and/or a high-boiling point fraction are removed, the activity of polymerization is significantly increased in the polymerization and copolymerization of the non-conjugated cyclic diene by using a specific catalyst component containing, for example, an organic aluminum oxy compound and/or ionizing ionic compound, to complete the present invention.

SUMMARY OF THE INVENTION

It is an object of the present invention to provide a non-conjugated cyclic diene enabling the production of a polymer based on non-conjugated cyclic diene at a high degree of polymerization activity. Another object of the present invention is to provide a non-conjugated cyclic diene composition which enables the production of a polymer based on non-conjugated cyclic diene at a high degree of polymerization activity and has high preserving stability. A further object of the present invention is to provide a method of producing a polymer based on non-conjugated cyclic diene at a high degree of polymerization activity when using a specific catalyst system. A still further object of the present invention is to provide a method of producing a polymer based on non-conjugated cyclic diene at a high degree of polymerization activity when using a specific catalyst system and also at a high degree of polymerization activity even after the non-conjugated cyclic diene is stored for a long period of time.

Accordingly, the present invention provides a non-conjugated cyclic diene characterized in that it satisfies at least one of the following (1) and (2);

(1) it contains a compound (A) having a seven-membered cyclic triene hydrocarbon structure in such an amount that the ratio (Wa/Wd) of the weight (Wa) of the compound (A) to the weight (Wd) of a non-conjugated cyclic diene is 0 or more and $5 \times 10^{-6}$ or less; and (2) it contains a conjugated polyene compound (B) having an eight-membered bicyclic hydrocarbon structure in such an amount that the ratio (Wb/Wd) of the weight (Wb) of the compound (B) to the weight (Wd) of a non-conjugated cyclic diene is 0 or more and $30 \times 10^{-6}$ or less.

Also, the present invention provides a non-conjugated cyclic diene composition comprising the above non-conjugated cyclic diene and an antioxidant.

The present invention provides a first method of producing a polymer based on non-conjugated cyclic diene comprising supplying the above non-conjugated cyclic diene to the polymerization or copolymerization using an olefin polymerization catalyst containing an organic aluminum oxy compound and/or an ionizing ionic compound.

The present invention also provides a second method of producing a polymer based on non-conjugated cyclic diene comprising supplying the above non-conjugated cyclic diene composition to the polymerization or copolymerization using an olefin polymerization catalyst containing an organic aluminum oxy compound and/or an ionizing ionic compound.

The present invention also provides a third method of producing a polymer based on non-conjugated cyclic diene comprising supplying a non-conjugated cyclic diene which is obtained by bringing a crude non-conjugated cyclic diene into contact with an alkali and then removing at least a part of a low-boiling point fraction and at least a part of a high-boiling point fraction to the polymerization or copolymerization using an olefin polymerization catalyst containing an organic aluminum oxy compound and/or an ionizing ionic compound.

The present invention also provides a fourth method of producing a polymer based on non-conjugated cyclic diene comprising supplying a non-conjugated cyclic diene composition containing a non-conjugated cyclic diene which is obtained by bringing a crude non-conjugated cyclic diene into contact with an alkali and then removing at least a part of a low-boiling point fraction and at least a part of a high-boiling point fraction and an antioxidant to the polymerization or copolymerization using an olefin polymerization catalyst containing an organic aluminum oxy compound and/or an ionizing ionic compound.

A polymer based on non-conjugated cyclic diene may be produced at a high degree of polymerization activity by polymerizing or copolymerizing the non-conjugated cyclic diene of the present invention by using an olefin polymerization catalyst. Also, the non-conjugated cyclic diene composition of the present invention enables a non-conjugated cyclic diene polymer to be produced at a high degree of polymerization activity and also has high preserving stability.

According to the first method of the present invention for producing a polymer based on non-conjugated cyclic diene, a polymer based on non-conjugated cyclic diene is obtained at a high degree of polymerization activity.

According to the second method of the present invention for producing a polymer based on non-conjugated cyclic diene, a polymer based on non-conjugated cyclic diene is obtained at a high degree of polymerization activity and also, the non-conjugated cyclic diene exhibits a high degree of polymerization activity in the case of polymerizing it after it is stored for a long period of time.

According to the third method of the present invention for producing a polymer based on non-conjugated cyclic diene, a polymer based on non-conjugated cyclic diene is obtained at a high degree of polymerization activity. Also, the loss of the non-conjugated cyclic diene is reduced in a series of treatments before the cyclic diene is polymerized, showing the method to be highly economical.

According to the fourth method of the present invention for producing a polymer based on non-conjugated cyclic diene, a polymer based on non-conjugated cyclic diene is obtained at a high degree of polymerization activity and also, the non-conjugated cyclic diene exhibits a high degree of polymerization activity in the case of polymerizing it after it is stored for a long period of time.

DETAILED DESCRIPTION OF THE INVENTION

A non-conjugated cyclic diene, a non-conjugated cyclic diene composition and a method of producing a polymer based on non-conjugated cyclic diene according to the present invention will be hereinafter explained in detail.

(Non-Conjugated Cyclic Diene)

The non-conjugated cyclic diene of the present invention is a cyclic compound having-two unsaturated bonds. This non-conjugated cyclic diene is preferably a hydrocarbon compound having preferably 6 to 20 carbon atoms and more preferably 6 to 12 carbon atoms. Examples of the non-conjugated cyclic diene of the present invention may include, though not particularly limited to, bicyclo[2.2.1]hept-2-ene derivatives having an alkylidene group such as 5-ethylidenebicyclo[2.2.1]hept-2-ene(5-ethylidene-2-norbornene), 5-ethylidene-6-methylbicyclo[2.2.1]hept-2-ene, 5-ethylidene-6-ethylbicyclo[2.2.1]hept-2-ene, 5-ethylidene-6-isopropylbicyclo[2.2.1]hept-2-ene, 5-ethylidene-6-butylbicyclo[2.2.1]hept-2-ene, 5-n-propylidenebicyclo[2.2.1]hept-2-ene, 5-n-propylidene-6-methylbicyclo[2.2.1]hept-2-ene, 5-n-propylidene-6-ethylbicyclo[2.2.1]hept-2-ene, 5-n-propylidene-6-isopropylbicyclo[2.2.1]hept-2-ene, 5-n-propylidene-6-butylbicyclo[2.2.1]hept-2-ene, 5-isopropylidenebicyclo[2.2.1]hept-2-ene, 5-isopropylidene-6-methylbicyclo[2.2.1]hept-2-ene, 5-isopropylidene-6-ethylbicyclo[2.2.1]hept-2-ene, 5-isopropylidene-6-isopropylbicyclo[2.2.1]hept-2-ene and 5-isopropylidene-6-butylbicyclo[2.2.1]hept-2-ene; bicyclo[2.2.1]hept-2-ene derivatives having an alkenyl group such as 5-ethenylbicyclo[2.2.1]hept-2-ene(5-vinyl-2-norbornene), 5-propenylbicyclo[2.2.1]hept-2-ene and 5-butenylbicyclo[2.2.1]hept-2-ene; dicyclopentadiene and cyclooctadiene. Among these groups, bicyclo[2.2.1]hept-2-ene derivatives having an alkylidene group and bicyclo[2.2.1]hept-2-ene derivatives having an alkenyl group are preferable and 5-ethylidene-2-norbornene and 5-vinyl-2-norbornene are most preferable.

In the present invention, the compound (A) having a seven-membered cyclic triene hydrocarbon structure is preferably a compound having a cycloalkatriene structure in at least a part thereof though no particular limitation is imposed on it and 1,3,5-cycloheptatriene and the like may be exemplified. That the non-conjugated cyclic diene contains such a compound having a seven-membered cyclic triene hydrocarbon structure may be confirmed, for example, by subjecting the non-conjugated cyclic diene to GC-MS analysis (Gas Chromatography Mass Spectrometry analysis) to determine the structure of each component to be contained. For example, 1,3,5-cycloheptatriene has a retention time longer than hexane and shorter than 5-ethylidene-2-norbornene in GLC analysis (gas/liquid chromatographic analysis) using a non-polar column. Then, the structures can be identified when the ratio of the intensities of a mass spectrum in an EI method shows the value described in the following table.

TABLE 1

| | Mass spectrum | | | |
|---|---|---|---|---|
| | 91 | 39 | 65 | 51 |
| Relative ratio | 1000 | 328 ± 32 | 164 ± 16 | 146 ± 14 |

Also, the conjugated polyene compound (B) having an eight-membered bicyclic hydrocarbon structure means a compound having, in at least a part thereof, a structure in which the ring is constituted of eight atoms and these eight atoms forms not a single ring but double rings. The compounds having such a structure are preferably, though not particularly limited to, compounds having a structure such as bicyclooctene or bicyclooctadiene in a part thereof. Examples of these compounds may include 2-ethylidene-bicyclo-[3.2.1]-oct-3-ene. That the non-conjugated cyclic diene contains such a conjugated polyene compound having an eight-membered bicyclic hydrocarbon structure may be confirmed, for example, by subjecting the non-conjugated cyclic diene to GC-MS analysis (Gas Chromatographic Mass Spectrometry analysis) to determine the structure of each component to be contained. For example, 2-ethylidene-bicyclo-[3.2.1]-oct-3-ene has a retention time longer than 5-ethylidene-2-norbornene and shorter than normal decane in GLC analysis (gas/liquid chromatographic analysis) using a non-polar column. Then, the structures can be identified when the ratio of the intensities of a mass spectrum in an EI method shows the value described in the following table.

TABLE 2

| | Mass spectrum | | | | | |
|---|---|---|---|---|---|---|
| | 80 | 27 | 119 | 41 | 91 | 134 |
| Relative ratio | 1000 | 709 ± 70 | 321 ± 32 | 294 ± 29 | 294 ± 29 | 294 ± 29 |

In this case, DB-1 (trade name, manufactured by J&W Scientific Inc.) may be used as the non-polar column.

Also, Wa/Wd, Wb/Wd and the like in the present invention are found as the peak area ratios of FID-GLC.

The non-conjugated cyclic diene of the present invention is characterized in that it satisfies at least one of the following (1) and (2) (hereinafter refereed to as "non-conjugated cyclic diene 1");

(1) it contains a compound (A) having a seven-membered cyclic triene hydrocarbon structure in such an amount that the ratio (Wa/Wd) of the weight (Wa) of the compound (A) to the weight (Wd) of a non-conjugated cyclic diene is 0 or more and $5 \times 10^{-6}$ or less, preferably 0 or more and less than $5 \times 10^{-6}$, more preferably 0 or more and $4 \times 10^{-6}$ or less and most preferably 0 or more and $3 \times 10^{-6}$ or less; and (2) it-contains a conjugated polyene compound (B) having an eight-membered bicyclic hydrocarbon structure in such an amount that the ratio (Wb/Wd) of the weight (Wb) of the compound (B) to the weight (Wd) of a non-conjugated cyclic diene is 0 or more and $30 \times 10^{-6}$ or less, preferably 0 or more and less than $30 \times 10^{-6}$, more preferably 0 or more and $25 \times 10^{-6}$ or less and most preferably 0 or more and $20 \times 10^{-6}$ or less.

Accordingly, the non-conjugated cyclic diene of the present invention may satisfy only (1) or (2) or the both.

The above Wa/Wd and Wb/Wd can be found by GLC analysis.

(Method of Producing the Non-Conjugated Cyclic Diene)

The aforementioned non-conjugated cyclic diene (non-conjugated cyclic diene 1) according to the present invention may be obtained by bringing a non-conjugated cyclic diene (hereinafter referred to as "untreated non-conjugated cyclic diene" if necessary) which satisfies the following (3) and (4) into contact with an alkali, for example, and then by separating and removing at least one of a low-boiling point fraction and at least one of a high-boiling point fraction with distillation operation;

(3) it contains a compound (A) having a seven-membered cyclic triene hydrocarbon structure in such an amount that the ratio (Wa/Wd) of the weight (Wa) of the compound (A) to the weight (Wd) of a non-conjugated cyclic polyene exceeds $5 \times 10^{-6}$, for example, in an amount ranging from $10 \times 10^{-6}$ to $200 \times 10^{-6}$; and (4) it contains a conjugated polyene compound (B) having an eight-membered bicyclic hydrocarbon structure in such an amount that the ratio (Wb/Wd) of the weight (Wb) of the compound (B) to the weight (Wd) of a non-conjugated cyclic polyene exceeds $30 \times 10^{-6}$, for example, in an amount ranging from $35 \times 10^{-6}$ to $400 \times 10^{-6}$.

As a non-conjugated cyclic diene satisfying the above (3) or (4), for example, commercially available products can be obtained in usual.

(Alkali-Contact Treatment)

Before the non-conjugated cyclic diene according to the present invention is produced, for example, alkali contact treatment is first carried out in which a non-conjugated cyclic diene (untreated non-conjugated cyclic diene) which satisfy the above (3) or (4) is brought into contact with an alkali.

Examples of the alkali used in the contact treatment with the above crude non-conjugated cyclic diene include aqueous NaOH, aqueous KOH and aqueous ammonia. The concentration of each of these aqueous alkalis is usually 0.001 N or more and preferably in a range from 0.05 to 1.0 N.

When the untreated non-conjugated cyclic diene is brought into contact with an aqueous alkali, the aqueous alkali is used in a ratio by volume of usually 0.001 to 100 and preferably 0.1 to 10 to 1 of the untreated non-conjugated cyclic diene mixture. The contact time of the untreated non-conjugated cyclic diene with the aqueous alkali is usually 1 to 100 minutes and preferably 5 to 30 minutes. The contact temperature is usually in a range from 0 to 100° C. and preferably in a range from 20 to 80° C., though no particular limitation is imposed on it. When the untreated non-conjugated cyclic diene is brought into contact with the aqueous alkali, the mixture may be stirred.

After the untreated non-conjugated cyclic diene is brought into contact with the aqueous alkali, the non-conjugated cyclic diene is separated from the water phase.

In the present invention, such an operation as mentioned above, namely the process of bringing the non-conjugated cyclic diene into contact with the aqueous alkali and separating the non-conjugated cyclic diene from the aqueous phase may be repeated plural times.

As the alkali, a solid alkali having a low compatibility with the untreated non-conjugated cyclic diene and with water may also be used. Specific examples of a method of using a solid alkali include a method in which the solid alkali is made to coexist with an untreated non-conjugated cyclic diene/water mixture in a batch system and a method in which an untreated non-conjugated cyclic diene/water mixture is flowed through a column packed with a solid alkali. Specific examples of the solid alkali include basic ion exchange resins, hydrotalcite and ion-carrying silica.

In the present invention, after the untreated non-conjugated cyclic diene is brought into contact with an alkali, it may be further brought into contact with ion exchange water or the like to carry out a separating operation, followed by washing the non-conjugated cyclic diene.

When the unreacted non-conjugated cyclic diene is brought into contact with ion exchange water after brought into contact with an alkali, the ion exchange water is used in a ratio by volume of usually 0.001 to 100 and preferably 0.1 to 10 to 1 of the non-conjugated cyclic diene. The contact time required to bring the component obtained by bringing the untreated non-conjugated cyclic diene into contact with an alkali into contact with the ion exchange water is usually 1 to 100 minutes and preferably 5 to 30 minutes. The contact temperature is usually in a range from 0 to 100° C. and preferably in a range from 20 to 80° C. though no particular limitation is imposed on it. When the component obtained by bringing the untreated non-conjugated cyclic diene into contact with the alkali is brought into contact with ion exchange water, stirring may be carried out.

After the component obtained by bringing the untreated non-conjugated cyclic diene into contact with the alkali is brought into contact with ion exchange water, the non-conjugated cyclic diene is separated from the water phase.

In the present invention, such an operation as mentioned above, namely the process of the component obtained by bringing the untreated non-conjugated cyclic diene into contact with the alkali is brought into contact with ion exchange water and separating the untreated non-conjugated cyclic diene from the aqueous phase may be repeated plural times.

(Distillation)

In the production of the non-conjugated cyclic diene according to the present invention, the untreated non-conjugated cyclic diene is brought into contact with an alkali, and then at least a part of a low-boiling point fraction and at least a part of a high-boiling point fraction are removed from the resulting components.

Here, the low-boiling point fraction in the present invention are components distilled from the top of a tower before main fraction are distilled in batch system distillation or components distilled from the top of a tower in the case of withdrawing main fraction from the bottom of the tower in continuous distillation, wherein in both cases, the low-boiling fraction usually contains a non-conjugated cyclic diene which is a target component. The high-boiling point fraction is components left non-distilled in a tower after main fraction is distilled from the top of the tower in a batch system distillation and is components withdrawn from the bottom of a tower in the case of distilling a main fraction from the top of the tower in continuous distillation, wherein in both cases, the high-boiling fraction usually contain a non-conjugated cyclic diene which is a target component.

It is to be noted that products obtained by subjecting a commercially available non-conjugated cyclic diene (untreated non-conjugated cyclic diene) to the foregoing alkali-contact treatment usually contains low-boiling point impurities in an amount of about 0.1 to 1.0% by weight and high-boiling point impurities in an amount of about 0.01 to 0.05% by weight.

A low-boiling point fraction and a high-boiling point fraction are usually removed by distillation using a conventionally known distilling tower. As the form of the tower, any of a tray type, irregular packings and regular packings may be used without any problem.

In the distillation of the non-conjugated cyclic diene, there is a fear of denaturing caused by a retro Diels-Alder reaction and the non-conjugated cyclic diene is therefore handled at 180° C. or less, preferably 120° C. or less and more preferably 100° C. or less. As to the pressure, the distillation is usually carried out under reduced pressure to meet the requirements as to the above temperature condition. The condition permitting of the tower top temperature ranging from 40 to 100° C. is preferable taking a cooling medium used in a condenser and the capacity of a vacuum device into account. The number of stages is preferably 5 to 100 and more preferably 15 to 60. The reflux ratio is preferably 0.1 to 50 and more preferably 0.5 to 10.

When the low-boiling point fraction and the high-boiling point fraction are removed, these low-boiling point fraction and high-boiling point fraction are removed in desired order.

When removing the low-boiling point fraction and high-boiling point fraction, it is preferable to remove each in an amount of 0.05% by weight or more, preferably 0.05 to 20% by weight and more preferably 1 to 10% by weight based on the weight of the non-conjugate cyclic diene which is a target before distilled.

Also, the above non-conjugated cyclic diene of the present invention may also be produced by treating the aforementioned untreated non-conjugated cyclic diene in the following manner. Specifically, the low-boiling point fraction and the high-boiling point fraction are removed by distillation. The low-boiling point fraction and high-boiling point fraction is respectively preferably removed in an amount of 2% by weight or more, preferably 2 to 20% by weight and more preferably 6 to 20% by weight based on the weight of the non-conjugate cyclic diene which is a target before distilled.

When the non-conjugated cyclic diene (non-conjugated cyclic diene 1) obtained in the above manner according to the present invention is supplied to the polymerization or copolymerization using, for example, an olefin polymerization catalyst containing an organic aluminum oxy compound and/or an ionizing ionic compound, the polymerization activity is higher than in the case of using a commercially available non-conjugated cyclic diene as it is. This is considered to be because the content of the aforementioned compound having a seven-membered cyclic triene hydrocarbon structure and/or the aforementioned conjugated polyene compound having an eight-membered bicyclic hydrocarbon structure is small.

In the third and fourth methods of producing a polymer based on non-conjugated cyclic diene according to the present invention, a non-conjugated cyclic diene (hereinafter referred to as "non-conjugated cyclic diene 2") obtained by bringing a crude non-conjugated cyclic diene into contact with an alkali and then by removing at least a part of low-boiling point fraction and at least a part of high-boiling point fraction is used.

The non-conjugated cyclic diene in the non-conjugated cyclic diene 2 is a cyclic compound having two unsaturated bonds. This non-conjugated cyclic diene is preferably a hydrocarbon compound and is a hydrocarbon compound having preferably 6 to 20 carbon atoms and more preferably 6 to 12 carbon atoms. As the non-conjugated cyclic diene of the present invention, bicyclo[2.2.1]hept-2-ene derivatives having an alkylidene group and bicyclo[2.2.1]hept-2-ene derivatives having an alkenyl group are preferable and 5-ethylidene-2-norbornene and 5-vinyl-2-norbornene are most preferable, as described in the item of the non-conjugated cyclic diene 1, though no particular limitation is imposed on it.

Here, examples of the crude non-conjugated cyclic diene include the following non-conjugated cyclic dienes.

Specific examples of the crude non-conjugated cyclic diene include (a) those obtained by distilling crude petroleum oil, (b) those obtained by cracking and isomerizing petroleum oil, followed by distilling, (c) those obtained by carrying out distillation after a Diels-Alder reaction and (d) those obtained by running a Diels-Alder reaction, followed by isomerization and distillation.

In the crude non-conjugated cyclic diene, there is the case where a compound X or a compound Y, for example, showing the following peaks in GC-MS spectrum exist.

Here, the compound X is a compound which has a retention time longer than hexane and shorter than 5-ethylidene-2-norbornene in GLC analysis (gas/liquid chromatographic analysis) using a non-polar column and of which the ratio of the intensities of a mass spectrum in an EI method shows the value described in the following table.

TABLE 3

| | Mass spectrum | | | |
|---|---|---|---|---|
| | 91 | 39 | 65 | 51 |
| Relative ratio | 1000 | 328 ± 32 | 164 ± 16 | 146 ± 14 |

Also, the compound Y has a retention time longer than 5-ethylidene-2-norbornene and shorter than normal decane in GLC analysis (gas/liquid chromatographic analysis) using a non-polar column. Then, the structures can be identified when the ratio of the intensities of a mass spectrum in an EI method shows the value described in the following table.

TABLE 4

| | Mass spectrum | | | | | |
|---|---|---|---|---|---|---|
| | 80 | 27 | 119 | 41 | 91 | 134 |
| Relative ratio | 1000 | 709 ± 70 | 321 ± 32 | 294 ± 29 | 294 ± 29 | 294 ± 29 |

As the non-polar column, DB-1 (manufactured by J&W Scientific Inc.) may be used. As regards the compounds X and Y contained in the crude non-conjugated cyclic diene, the compound X is contained in such an amount that the ratio of the weight (Wx) of the compound X to the weight (Wdd) of the target non-conjugated cyclic diene is preferably a value exceeding $5 \times 10^{-6}$ and, for example, in a ratio of $10 \times 10^{-6}$ to $200 \times 10^{-6}$. In the case of the compound Y, the compound Y is contained in such an amount that the ratio of the weight (Wy) of the compound Y to the weight (Wdd) of the target non-conjugated cyclic diene is preferably a value exceeding $30 \times 10^{-6}$ and, for example, in a ratio of $35 \times 10^{-6}$ or more and $400 \times 10^{-6}$ or less.

Examples of other impurities include those contained in commercially available non-conjugated cyclic dienes, for example, oxygen-containing compounds such as peroxides and isomers (e.g., 5-vinyl-2-norbornene in the case of 5-ethylidene-2-norbornene).

For example, a commercially available cyclic olefin non-conjugated cyclic diene usually contains impurities in a ratio by weight of $100 \times 10^{-6}$ or more, for instance, $100 \times 10^{-6}$ to $1000 \times 10^{-6}$ to the target non-conjugated cyclic diene.

In the third or fourth method of producing a polymer based on non-conjugated cyclic diene of the present invention, the same method that is used in the aforementioned method of producing the non-conjugated cyclic diene 1 may be exemplified as the method in which the crude non-conjugated cyclic diene is brought into contact with an alkali and as the method in which at least a part of a low-boiling point fraction and at least a part of a high-boiling point fraction are removed from the non-conjugated cyclic diene which has been brought into contact with an alkali.

When anon-conjugated cyclic diene 2 obtained by subjecting a commercially available non-conjugated cyclic diene (one example of the crude non-conjugated cyclic diene) to the aforementioned alkali-contact treatment and distillation is used as a monomer for olefin polymerization, it exhibits higher polymerization activity than in the case of using the commercially available non-conjugated cyclic diene as it is. The non-conjugated cyclic diene 2 also exhibits still higher polymerization activity than a non-conjugated cyclic diene obtained by carrying out refining and the like using other methods.

(Non-Conjugated Cyclic Diene Composition)

The non-conjugated cyclic diene composition according to the present invention is a composition (hereinafter referred to as "non-conjugated cyclic diene composition 1") comprises the non-conjugated cyclic diene (non-conjugated cyclic diene 1) according to the present invention and an antioxidant.

Also, a composition comprising the non-conjugated cyclic diene 2 and an antioxidant is referred to as "non-conjugated cyclic diene composition 2" if necessary.

(Antioxidant)

Examples of the antioxidant used in the present invention include a phenol type antioxidant, sulfur type antioxidant and phosphorous type antioxidant.

Examples of the phenol type antioxidant include phenols such as 2,6-di-tert-butyl-methylphenol, stearyl(3,3-dimethyl-4-hydroxybenzyl)thioglycolate, stearyl-β-(4-hydroxy-3,5-di-tert-butylphenol)propionate, distearyl-3,5-di-tert-butyl-4-hydroxybenzylphosphonate, 2,4,6-tris(3',5'-di-tert-butyl-4'-hydroxybenzylthio)-1,3,5-triazine, distearyl(4-hydroxy-3-methyl-5-tert-butylbenzyl)malonate, 2,2'-methylenebis(4-methyl-6-tert-butylphenol), 4,4'-methylenebis(2,6'-di-tert-butylphenol), 2,2'-methylenebis[6-(1-methylcyclohexyl)p-cresol], bis[3,5-bis[4-hydroxy-3-tert-butylphenyl]butyric acid]glycol ester, 4,4'-butylidenebis(6-tert-butyl-m-cresol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butyl)benzylisocyanurate, 1,3,5-tris(3,5-di-tert-butyl-4-hydroxybenzyl)-2,4,6-trimethylbenzene, tetrakis[methylene-3-(3,5-di-tert-butyl-4-hydroxyphenyl)propionate]methane, 1,3,5-tris(3,5-di-tert-butyl-4-hydroxybenzyl)isocyanurate, 1,3,5-tris[(3,5-di-tert-butyl-4-hydroxyphenyl)propionyloxyethyl] isocyanurate, 2-octylthio-4,6-di(4-hydroxy-3,5-di-tert-butyl)phenoxy-1,3,5-triazine and 4,4'-thiobis(6-tert-butyl-m-cresol) and polyhydric phenol carbonic acid oligo esters such as a carbonic acid oligo ester (e.g., degree of polymerization: 2 to 10) of 4,4'-butylidenebis(2-tert-butyl-5-methylphenol).

Examples of the sulfur type antioxidant include esters (e.g., pentaerythritol tetralaurylthiopropionate) of polyhydric alcohols (e.g., glycerin, trimethylol ethane, trimethylol propane, pentaerythritol, trishydroxyisocyanurate) of dialkylthiodipropionate such as dilauryl-, dimyristyl- or distearyl-propionate and alkylthiopropionic acids such as butyl-, octyl-, lauryl- or stearyl-thiopropionic acid.

Examples of the phosphorous type antioxidant include trioctyl phosphite, trilauryl phosphite, tridecyl phosphite, octyl-diphenylphosphite, tris(2,4-di-tert-butylphenyl) phosphite, triphenyl phosphite, tris(butoxyethyl) phosphite, tris (nonylphenyl) phosphite, distearylpentaerythritol diphosphite, tetra(tridecyl)-1,1,3-tris(2-methyl-5-tert-butyl-4-hydroxyphenyl)butane diphosphite, tetra($C_{12}$–$C_{15}$ mixed alkyl)-4,4'-isopropylidenediphenyl diphosphite, tetra(tridecyl)-4,4'-butylidenebis(3-methyl-6-tert-butylphenol) diphosphite, tris(3,5-di-tert-butyl-4-hydroxyphenyl) phosphite, tris(mono/di mixed nonylphenol) phosphite, hydrogenated-4,4'-isopropylidenediphenol polyphosphite, bis(octylphenyl)/bis[4,4'-butylidenebis(3-methyl-6-tert-butylphenol)]/1,6-hexanediol diphosphite, phenyl/4,4'-isopropylidenediphenol/pentaerythritol diphosphite, bis(2,4-di-tert-butylphenyl)pentaerythritol diphosphite, bis(2,6-di-tert-butyl-4-methylphenyl)pentaerythritol diphosphite, tris[4,4'-isopropylidenebis(2-tert-butylphenol)]phosphite, phenyl/diisodecyl phosphite, di(nonylphenyl)pentaerythritol diphosphite, tris(1,3-di-stearoyloxyisopropyl) phosphite, 4,4'-isopropylidenebis(2-tert-butylphenol)/di(nonylphenyl) phosphite, 9,10-di-hydro-9-oxa-10-phosphaphenanthrene-10-oxide and tetrakis(2,4-di-tert-butylphenyl)-4,4'-biphenylene diphosphonite.

Moreover, as other antioxidants, 6-hydroxychroman derivatives, for example, various types of tocopherols such as α, β, γ and δ tocopherols or mixtures of these compounds, 2,5-dimethyl, 2,5,8-trimethyl or 2,5,7,8-tetramethyl substituted products of 2-(4-methyl-penta-3-enyl)-6-hydroxychroman, 2,2,7-trimethyl-5-tert-butyl-6-hydroxychroman, 2,2,5-trimethyl-7-tert-butyl-6-hydroxychroman, 2,2,5-trimethyl-6-tert-butyl-6-hydroxychroman and 2,2-dimethyl-5-tert-butyl-6-hydroxychroman may also be used.

These antioxidants may be used either singly or in combinations of two or more.

It is particularly preferable to use phenol type antioxidants or phosphorous type antioxidant among these antioxidants. These antioxidants scarcely inhibit the polymerization of a non-conjugated cyclic diene and allow the aforementioned non-conjugated cyclic diene composition 1 or non-conjugated cyclic diene composition 2 to have high preserving stability.

(Composition, Preparation Method)

The foregoing non-conjugated cyclic diene composition 1 contains the aforementioned non-conjugate cyclic diene 1 and antioxidant, wherein the antioxidant is usually contained in a ratio of 0.1 to 1000 ppm and preferably 1 to 100 ppm to the total amount of the non-conjugated cyclic diene 1 and the antioxidant. The foregoing non-conjugated cyclic diene composition 2 contains the aforementioned non-conjugated cyclic diene 2 and antioxidant, wherein the antioxidant is usually contained in a ratio of 0.1 to 1000 ppm and preferably 1 to 100 ppm to the total amount of the non-conjugated cyclic diene 2 and the antioxidant.

The non-conjugated cyclic diene compositions 1 and 2 each containing the antioxidant in the above ratio have high preserving stability and are reduced in the drop of polymerization activity even after stored for a long-period of time (for example, 140 days).

The above non-conjugated cyclic diene composition 1 may be prepared by blending the above non-conjugated cyclic diene 1 with the above antioxidant and by stirring the mixture according to the need. The temperature in mixing the both is preferably in a range from 10 to 60° C. though no particular limitation is imposed on it.

The above non-conjugated cyclic diene composition 2 may be prepared by blending the above non-conjugated cyclic diene 2 with the above antioxidant and by stirring the mixture according to the need. The temperature used when mixing the both is preferably in a range from 10 to 60° C. though no particular limitation is imposed on it.

(Method of Producing the Polymer Based on Non-conjugated Cyclic Diene)

The method of producing a polymer based on non-conjugated cyclic diene according to the present invention involves a process of supplying the above non-conjugated cyclic diene 1, non-conjugated cyclic diene 2, non-conjugated cyclic diene composition 1 or non-conjugated cyclic diene composition 2 to the polymerization or copolymerization using an olefin polymerization catalyst containing an organic aluminum oxy compound and/or ionizing ionic compound.

Examples of olefins other than the above non-conjugated cyclic diene 1, non-conjugated cyclic diene 2, non-conjugated cyclic diene composition 1 or non-conjugated cyclic diene composition 2 which are used for polymerization or copolymerization in the present invention include chain olefins, branched olefins and non-conjugated polyenes other than non-conjugated cyclic dienes. Also, for example, when using the non-conjugated cyclic diene 1 or the non-conjugated cyclic diene composition 1 containing the non-conjugated cyclic diene 1, a non-conjugated cyclic diene other than the non-conjugated cyclic diene 1, namely, a non-conjugated cyclic diene which meets none of the above requirements (1) and (2) maybe combined. Also, for example, when using the non-conjugated cyclic diene 2 or the non-conjugated cyclic diene composition 2 containing the non-conjugated cyclic diene 2, a non-conjugated cyclic diene other than the non-conjugated cyclic diene 2, namely, a non-conjugated cyclic diene may be combined which has not been subjected to such a series of treatment that it is brought into contact with an alkali and then, at least a part of a low-boiling point fraction and at least a part of a high-boiling point fraction are removed. However, among these non-conjugated cyclic dienes, those containing the non-conjugated cyclic dienes 1 and 2 in a higher ratio are more preferable.

As the olefin polymerization catalyst, any catalyst system may be used without any particular limitation insofar as it contains an organic aluminum oxy compound and/or ionizing ionic compound. For example, transition metal compound catalysts comprising a transition metal compound and an organic aluminum oxy compound and/or ionizing ionic compound are preferable from the viewpoint of activity. Preferable examples of the transition metal compound may include metallocene compounds of the group 4 transition metals in the periodic table.

Examples of the metallocene compounds of the group 4 transition metals in the periodic table which are preferably used in the present invention include the following compounds.

$$ML_x \hspace{2cm} (I)$$

wherein M represents a transition metal selected from the group 4 transition metals in the periodic table and specifically, zirconium, titanium or hafnium and x denotes a number meeting the atomic value of the transition metal.

Ls respectively represent a ligand coordinated with the transition metal wherein, among these Ls, at least one ligand L represents a group (ligand) having a cyclopentadienyl skeleton and this ligand having a cyclopentadienyl skeleton may have a substituent.

Examples of the ligand having a cyclopentadienyl skeleton include a cyclopentadienyl group; alkyl substituted or cycloalkyl substituted cyclopentadienyl groups such as a methylcyclopentadienyl group, ethylcyclopentadienyl group, n- or i-propylcyclopentadienyl group, n-, i-, sec- or t-butylcyclopentadienyl group, hexylcyclopentadienyl group, octylcyclopentadienyl group, dimethylcyclopentadienyl group, trimethylcyclopentadienyl group, tetramethylcyclopentadienyl group, pentamethylcyclopentadienyl group, methylethylcyclopentadienyl group, methylpropylcyclopentadienyl group, methylbutylcyclopentadienyl group, methylhexylcyclopentadienyl group, methylbenzylcyclopentadienyl group, ethylbutylcyclopentadienyl group, ethylhexylcyclopentadienyl group and methylcyclohexylcyclopentadienyl group, indenyl groups, 4,5,6,7-tetrahydroindenyl groups and fluorenyl groups.

These ligands having a cyclopentadienyl skeleton may be further substituted with a halogen atom, trialkylsilyl group or the like. Among these substituted compounds, alkyl substituted cyclopentadienyl groups are particularly preferable.

When the compound represented by the above formula (I) has two or more groups having a cyclopentadienyl skeleton as ligand L, two groups having a cyclopentadienyl skeleton among these groups may be bound with each other through an alkylene group such as ethylene and propylene; substituted alkylene group such as isopropylidene and diphenylmethylene; silylene group; or substituted silylene group such as dimethylsilylene, diphenylsilylene and methylphenylsilylene.

Examples of L other than these ligands having a cyclopentadienyl skeleton include a hydrocarbon group having 1 to 12 carbon atoms, alkoxy group, aryloxy group, sulfonic acid-containing group ($-SO_3R^a$ where $R^a$ represents an alkyl group, a halogen substituted alkyl group, an aryl group, a halogen substituted aryl group or an alkyl substituted aryl group), halogen atom or hydrogen atom.

Examples of the hydrocarbon group having 1 to 12 carbon atoms include alkyl groups, cycloalkyl groups, aryl groups and aralkyl groups. Specific examples of these hydrocarbon groups include alkyl groups such as methyl, ethyl, n-propyl, isopropyl, n-butyl, isobutyl, sec-butyl, t-butyl, pentyl, hexyl, octyl, decyl and dodecyl; cycloalkyl groups such as a cyclopentyl group and cyclohexyl group; aryl groups such as phenyl and tolyl; and aralkyl groups such as benzyl and neophyl.

Also, examples of the alkoxy group include methoxy, ethoxy, n-propoxy, isopropoxy, n-butoxy, isobutoxy, sec-butoxy, t-butoxy, pentoxy, hexoxy and octoxy.

Examples of the aryloxy group include phenoxy.

Examples of the sulfonic acid-containing group ($—SO_3R^a$) include methane sulfonate, p-toluene sulfonate, trifluoromethane sulfonate and p-chlorobenzene sulfonate. Examples of the halogen atom include fluorine, chlorine, bromine and iodine.

Examples of the transition metal compounds having zirconium as M and containing two ligands having a cyclopentadienyl skeleton will be given below.

Specifically, examples of these transition metal compounds include bis(cyclopentadienyl)zirconium monochloride monohydride, bis(cyclopentadienyl)zirconium dichloride, bis(1-methyl-3-butylcyclopentadienyl)zirconiumbis(trifluoromethanesulfonate), bis(1,3-dimethylcyclopentadienyl)zirconium dichloride, ethylene-bis(indenyl)dimethylzirconium, ethylene-bis(indenyl)zirconium dichloride, isopropylidene(cyclopentadienyl-fluorenyl)zirconium dichloride, diphenylsilylene-bis(indenyl)zirconium dichloride, methylphenylsilylene-bis(indenyl)zirconium dichloride, rac-ethylene-bis(2-methyl-1-indenyl)zirconium dichloride, rac-dimethylsilylene-bis(2-methyl-1-indenyl)zirconium dichloride, rac-dimethylsilylene-bis(4,7-dimethyl-1-indenyl)zirconium dichloride, rac-dimethylsilylene-bis(2,4,7-trimethyl-1-indenyl)zirconium dichloride, rac-dimethylsilylene-bis(2,4,6-trimethyl-1-indenyl)zirconium dichloride, rac-dimethylsilylene-bis(4-phenyl-1-indenyl)zirconium dichloride, rac-dimethylsilylene-bis(2-methyl-4-phenyl-1-indenyl)zirconium dichloride, rac-dimethylsilylene-bis(2-methyl-4-(α-naphthyl)-1-indenyl)zirconium dichloride, rac-dimethylsilylene-bis(2-methyl-4-(β-naphthyl)-1-indenyl)zirconium dichloride and rac-dimethylsilylene-bis(2-methyl-4-(1-anthryl)-1-indenyl)zirconium dichloride.

Also, transition metal compounds obtained by replacing the zirconium metal with a titanium metal or hafnium metal in the compounds as those mentioned above may be exemplified.

In the present invention, compounds represented by the following formula (II) may also be used as the transition metal compound.

$$L^1M^1X_2 \quad (II)$$

wherein $M^1$ represents a transition metal selected from the group 4 metals, $L^1$ represents a derivative of a delocalized π bond group and imparts a constrained geometry to the active site of the metal $M^1$ and Xs respectively represent hydrogen, a halogen, a hydrocarbon group having 20 or less carbon atoms, a silyl group having 20 or less silicon atoms or a germyl group having 20 or less germanium atoms.

Among these compounds represented by the formula (II), compounds represented by the following formula (III) are preferable.

[Chemical formula 1]

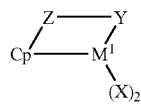

(III)

wherein $M^1$ represents titanium, zirconium or hafnium, X is the same as above and Cp represents a cyclopentadienyl group which is π-bonded with $M^1$ and may have a substituent.

Z represents a ligand containing at least one element selected from oxygen, sulfur, boron and an element of group 14 in the periodic table (e.g., carbon, silicon, germanium and tin).

Y represents a ligand having nitrogen, phosphorous, oxygen or sulfur.

Also, Z and Y may form a condensed ring.

Specific examples of the compound represented by the formula (III) include [dimethyl(t-butylamido)(tetramethyl-$η^5$-cyclopentadienyl)silane]titanium dichloride, [(t-butylamido)(tetramethyl-$η^5$-cyclopentadienyl)-1,2-ethanediyl]titanium dichloride, [dibenzyl(t-butylamido)(tetramethyl-$η^5$-cyclopentadienyl)silane]titanium dichloride, [dimethyl(t-butylamido)(tetramethyl-$η^5$-cyclopentadienyl)silane]dibenzyltitanium, [dimethyl(t-butylamido)(tetramethyl-$η^5$-cyclopentadienyl)silane]dimethyltitanium, [(t-butylamido)(tetramethyl-$η^5$-cyclopentadienyl)-1,2-ethanediyl]dibenzyltitanium, [(methylamido)(tetramethyl-$η^5$-cyclopentadienyl)1,2-ethanediyl]dineopentyltitanium, [(phenylphosphido)(tetramethyl-$η^5$-cyclopentadienyl)methylene]diphenyltitanium, [dibenzyl(t-butylamido)(tetramethyl-$η^5$-cyclopentadienyl)silane]dibenzyltitanium, [dimethyl(benzylamido)($η^5$-cyclopentadienyl)silane]di(trimethylsilyl)titanium, [di-methyl(phenylphosphido)(tetramethyl-$η^5$-cyclopentadienyl)silane]dibenzyltitanium, [(tetramethyl-$η^5$-cyclopentadienyl)-1,2-ethanedily]dibenzyltitanium, [2-$η^5$-(tetramethyl-cyclopentadienyl)-1-methyl-ethanolate]dibenzyltitanium, [2-$η^5$-(tetramethyl-cyclopentadienyl-1-methyl-ethanolate]dimethyltitanium, [2-((4a,4b,8a,9,9a-η)-9H-fluorene-9-yl)cyclohexanolate]dimethyltitanium, and [2-((4a,4b,8a,9,9a-η)-9H-fluorene-9-yl)cyclohexanolate]dibenzyltitanium.

Also, compounds obtained by replacing the titanium metal with a zirconium metal or hafnium metal in the compounds as those mentioned above may be exemplified.

These transition metal compounds may be used either singly or in combinations of two or more.

(Organic Aluminum Oxy Compound)

The organic aluminum oxy compound forming the olefin polymerization catalyst according to the present invention may be conventionally known aluminoxane or a benzene-insoluble organic aluminum oxy compound (see, for example, the publication of JP-A No. 2-78687).

The conventionally known aluminoxane is represented by the following formula (1) or (2), specifically.

[Chemical formula 2]

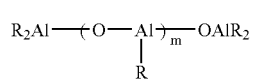  (i)

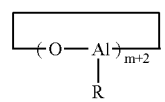  (ii)

In the above formula, R represents a hydrocarbon group such as methyl, ethyl, propyl or butyl, preferably methyl or ethyl and particularly preferably methyl and m denotes an integer of 2 or more and preferably 5 to 40.

Here, this aluminoxane may be formed of a mixed alkyloxy aluminum unit consisting of an alkyloxy aluminum unit represented by the formula ($OAl(R^{11})$) and an alkyloxy aluminum unit represented by the formula (OAl(R$^{12}$)) (where R$^{11}$ and R$^{12}$ may be respectively represented by the same hydrocarbon group as R wherein R$^{11}$ and R$^{12}$ represent groups different from each other).

(Ionizing Ionic Compound)

The ionizing ionic compound forming the olefin polymerization catalyst according to the present invention is a compound which reacts with the above transition metal compound to form an ionic compound or reacts with the reaction product of the above transition metal compound and the following organic aluminum compound to form an ionic compound, and examples of the ionic compound include Lewis acids and ionic compounds.

Examples of the above Lewis acid include compounds represented by BR$^{13}_3$ (R$^{13}$ represents a phenyl group which may have a substituent such as fluorine, methyl or trifluoromethyl or fluorine). Specific examples of these Lewis acids include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

Examples of the ionic compound may include trialkyl substituted ammonium salts, N,N-dialkylanilinium salts, dialkylammonium salts and triarylphosphonium salts.

Specific examples of the trialkylsubstituted ammonium salt include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl)boron and tri(n-butyl)ammoniumtetra(o-tolyl)boron.

Examples of the N,N-dialkylanilinium salt include N,N-dimethylaniliniumtetra(phenyl)boron, N,N-diethylaniliniumtetra(phenyl)boron and N,N,2,4,6-pentamethylaniliniumtetra(phenyl)boron.

Examples of the dialkylammonium salt include di(1-propyl)ammoniumtetra(pentafluorophenyl)boron and dicyclohexylammoniumtetra(phenyl)boron.

Moreover, examples of the ionic compound may include triphenylcarbeniumtetrakis(pentafluorophenyl)borate, N,N-dimethylaniliniumtetrakis(pentafluorophenyl)borate and ferroceniumtetra(pentafluorophenyl)borate.

(Organic Aluminum Compound)

The metallocene type catalyst may contain an organic aluminum compound together with the aforementioned organic aluminum oxy compound and/or ionizing ionic compound.

Such an organic aluminum compound is represented by the following formula (V).

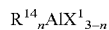

$$R^{14}{}_n AlX^1{}_{3-n} \quad (V)$$

wherein R$^{14}$ represents a hydrocarbon group having 1 to 15 and preferably 1 to 4 carbon atoms, X$^1$ represents a halogen atom or a hydrogen atom and n denotes a number from 1 to 3.

Examples of the hydrocarbon group having 1 to 15 carbon atoms include an alkyl group, cycloalkyl group and aryl group. Specific examples of the hydrocarbon group include methyl, ethyl, n-propyl, isopropyl, isobutyl, pentyl, hexyl, octyl, cyclopentyl, cyclohexyl, phenyl and tolyl.

Examples of the organic aluminum compound include the following compounds:

trialkylaluminum such as trimethylaluminum, triethylaluminum, triisopropylaluminum, triisobutylaluminum, trioctylaluminum and tri-2-ethylhexylaluminum;

alkenylaluminum such as isoprenylaluminum represented by the formula (i-C$_4$H$_9$)$_x$Al$_y$(C$_5$H$_{10}$)$_z$ (where x, y and z are respectively a positive number and z≧2x);

trialkenylaluminum such as triisopropenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide;

dialkylaluminum hydrides such as diethylaluminum hydride and dibutylaluminum hydride; and alkylaluminum dihydrides such as ethylaluminum dihydride and propylaluminum dihydride.

(Polymerization condition)

In the method of producing a polymer based on non-conjugated cyclic diene according to the present invention, the above non-conjugated cyclic diene 1, non-conjugated cyclic diene 2, non-conjugated cyclic diene composition 1 or non-conjugated cyclic diene composition 2 and according to the need, other olefins are subjected to polymerization using an olefin polymerization catalyst.

Among the non-conjugated cyclic dienes used for the polymerization, an unreacted one may be used again for polymerization after it is treated in the same manner as above, specifically, at least a part of a low-boiling point fraction and at least a part of a high-boiling point fraction are removed after it is brought into contact with an alkali. Or a part or all of the purifying process may be omitted to subject the unreacted non-conjugated cyclic diene again to the polymerization.

As the polymerization method used when the polymer based on non-conjugated cyclic diene of the present invention is produced, liquid phase polymerization methods such as a suspension polymerization method and solution polymerization method may be usually adopted.

Specific examples of the hydrocarbon medium used in the liquid polymerization method include aliphatic hydrocarbons such as propane, butane, pentane, hexane, heptane, octane, decane, dodecane and hexadecane; alicyclic hydrocarbons such as cyclopentane, cyclohexane, methylcyclopentane and cyclooctane; aromatic hydrocarbons such as benzene, toluene, and xylene; halogenated hydrocarbons such as ethylene chloride, chlorobenzene and dichloromethane; petroleum fractions such as gasoline, kerosene and light gas oil or mixtures of these compounds may be used.

Moreover, olefins used for the polymerization may be used as the hydrocarbon medium.

When the transition metal compound is used in the polymerization, the transition metal compound is used in such an amount that the concentration of the transition metal atom in the polymerization reaction system is usually 10$^{-8}$ to 10$^{-3}$ gram atom/l (medium) and preferably 10$^{-7}$ to 10$^{-4}$ gram atom/l (medium).

The organic aluminum oxy compound is used in such an amount that the atomic ratio (Al/M) of aluminum (Al) contained in the organic aluminum oxy compound to the transition metal (M) contained in the transition metal compound falls usually in a range from 10 to 10000 and preferably in a range from 20 to 5000.

The ionizing ionic compound is used in such an amount that the molar ratio (transition metal compound/ionizing ionic compound) of the transition metal compound to the ionizing ionic compound falls usually in a range from 0.01 to 10 and preferably in a range from 0.1 to 5.

Also, the organic aluminum compound used according to the need is used in such an amount that the atomic ratio ($Al^1/Al^2$) of an aluminum atom ($Al^1$) contained in the organic aluminum compound to an aluminum atom ($Al^2$) contained in the organic aluminum oxy compound falls usually in a range from 0.02 to 20 and preferably in a range from 0.2 to 10.

As the polymerization catalyst, a combination of the transition metal compound and the ionizing ionic compound has a particularly significant effect and is among preferable embodiments.

The temperature in the polymerization reaction is usually in a range from −50 to 230° C. and preferably in a range from −30 to 200° C. As to the polymerization pressure, the polymerization reaction is run under the condition of usually normal atmospheric pressure to 10 MPa and preferably normal atmospheric pressure to 5 MPa. The polymerization reaction may be run in any of a batch system, semi-continuous system and continuous system or may be run in two or more stages differing in reaction condition. The molecular weight of the resulting copolymer may be regulated by the amount of hydrogen and/or polymerization temperature. In the present invention, in particular, a particularly high effect is obtained when adopting a continuous polymerization method. Specifically, the polymerization activity of the catalyst is significantly improved in the production of the polymer based on non-conjugated, cyclic diene.

In the present invention, the polymerization reaction mixture obtained after the polymerization reaction is finished is treated by a usual method to thereby obtain a polymer based on non-conjugated cyclic diene. If the aforementioned non-conjugated cyclic diene 1, non-conjugated cyclic diene 2, non-conjugated cyclic diene composition 1 or non-conjugated cyclic diene composition 2 is supplied to the polymerization or copolymerization in the presence of the olefin polymerization catalyst containing an organic aluminum oxy compound and/or ionizing ionic compound in the above manner, the polymer based on non-conjugated cyclic diene can be produced at a high degree of polymerization activity. Particularly, in the case where 30 days or more passed after the non-conjugated cyclic diene composition 1 or 2 is prepared, these compositions still exhibit a high degree of polymerization activity.

The resulting polymer based on non-conjugated cyclic diene contains a repeat unit derived from the non-conjugated cyclic diene in a ratio of usually 0.1% by weight or more, preferably in a range from 1 to 90% by weight and more preferably 1 to 70% by weight. Also, the resulting polymer based on non-conjugated cyclic diene contains a repeat unit derived from a monomer other than the non-conjugated cyclic diene, for example, chain or branched α-olefins in an amount of usually 99.9% by weight or less, preferably in a range from 10 to 99% by weight and more preferably in a range from 30 to 99% by weight. Examples of the polymer based on non-conjugated cyclic diene include an ethylene/α-olefin/non-conjugated cyclic polyene copolymer containing 0.1% by weight or more of a non-conjugated cyclic diene unit and a total of 99.9% by weight or less of ethylene and α-olefin having 3 to 20 carbon atoms and an ethylene/α-olefin/non-conjugated cyclic polyene copolymer containing 0.1% by weight or more of a non-conjugated cyclic diene unit and a total of 99.9% by weight or less of ethylene, α-olefin having 3 to 20 carbon atoms and an polyene other than the non-conjugated cyclic diene.

The intrinsic viscosity [η] of the polymer based on non-conjugated cyclic diene in decalin at 135° C. is usually 0.005 to 20 dl/g and preferably in a range from 0.01 to 10 dl/g, though no particular limitation is imposed on the viscosity.

The method of producing the non-conjugated cyclic diene, non-conjugated cyclic diene composition or polymer based on non-conjugated cyclic diene of the present invention is useful particularly to produce a polymer based on non-conjugated cyclic diene in an industrial scale.

EXAMPLES

The present invention will be explained in more detail by way of examples, which, however, are not intended to be limiting of the present invention.

Each mass spectrum of the compounds A and B were found by GC-MS (Gas Chromatography Mass Spectrometry analysis).

The condition of GC accorded to the condition of GLC (gas/liquid chromatography) described below.

An EI method was used for ionization under the following condition: electronic voltage: 70 electron volts and electron current: 60 micro amperes.

Each content of the compounds (A) and (B) was measured by GLC in the examples.

For GLC, GC17A (trade name) manufactured by Shimadzu Corporation was used as the body and DB-1 (trade name) (0.25 mm×60 m) manufactured by J&W Scientific Inc. was used as the column. The INJ temperature was set to 180° C., Helium was used as the carrier gas and the pressure was set to 136 kPa. The sample was injected in an amount of 0.5 μl and the sprit ratio was set to 200. The column temperature was set as follows.

TABLE 5

| Step | 1 | 2 |
|---|---|---|
| Initial temperature (° C.) | 90 | — |
| Temperature rise rate (° C./minutes) | — | 3 |
| Final temperature (° C.) | — | 180 |
| Retention time (minutes) | 9 | 1 |

FID was used for detection. The data was processed by Chromato-pack C-R3A (trade name) manufactured by Shimadzu Corporation.

The peaks were separated by an automatic processing method and peaks which have a first transition angle of 60° or less, an area less than 10 or a gas chromatographic retention time of 40 minutes or more were neglected.

The gas chromatographic retention time of each component is as follows.

TABLE 6

| | Name of component | | |
|---|---|---|---|
| | ENB | Compound A | Compound B |
| Retention time (minutes) | 12.25  12.43 | 8.00 | 13.11 |

Example 1

(Alkali Contact Treatment)

5-ethylidene-2-norbornene (hereinafter abbreviated as "ENB", manufactured by Sun Petrochemical Company) Lot 3B02 was used.

GLC analysis using the above non-polar column of this ENB resulted in the detection of a compound which had a longer retention time than hexane and a shorter retention time than 5-ethylidene-2-norbornene and showed the following spectrum. From this spectrum, the compound was identified as 1,3,5-cycloheptatriene (corresponds to the compound (A) having the structure of a seven-membered cyclic triene hydrocarbon)

TABLE 7

| | Mass spectrum | | | |
|---|---|---|---|---|
| | 91 | 39 | 65 | 51 |
| Relative ratio | 1000 | 328 | 164 | 146 |

Also, GLC analysis using the above non-polar column resulted in the detection of a compound which had a longer retention time than 5-ethylidene-2-norbornene and a shorter retention time than normal decane and showed the following spectrum. From this spectrum, the compound was identified as 2-ethylidene-bicyclo-[3.2.1]-oct-3-ene which is represented by the following formula (VI) (corresponds to the conjugated polyene compound (B) having an eight-membered bicyclic hydrocarbon structure).

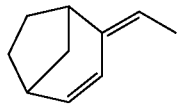

(VI)

TABLE 8

| | Mass spectrum | | | | | |
|---|---|---|---|---|---|---|
| | 80 | 27 | 119 | 41 | 91 | 134 |
| Relative ratio | 1000 | 709 | 321 | 294 | 294 | 294 |

This ENB was subjected to GLC analysis, to find that the ratio (Wa/Wd) of the amount of the compound (A) having a seven-membered cyclic triene hydrocarbon structure to the amount of ENB was $9.5\times10^{-6}$ and the ratio (Wb/Wd) of the amount of the conjugated polyene compound (B) having an eight-membered bicyclic hydrocarbon structure to the amount of ENB was $135\times10^{-6}$.

150 ml of this ENB was mixed with 50 ml of aqueous 0.1 N NaOH and the mixture was stirred for 5 minutes, followed by separating and this operation was repeated three times. Next, this ENB which had been brought into contact with aqueous NaOH was mixed with 50 ml of ion exchange water and the mixture was stirred for 5 minutes, followed by separating and this operation was repeated three times to obtain alkali-contact treated ENB. This process was repeated five times to obtain a total of 700 ml of alkali-contact treated ENB (1).

(Distillation)

An Oldersho 15-stage batch system distiller was used. 540 g of the above ENB (1) was charged to the distiller to start heating under the condition of a top pressure of 10.6 kPa. First, ENB (1) was distilled under a reflux ratio (rr) of 10 to discharge 27 g of the fraction. Then, the rr was changed to 3 to continue distillation until the amount of the residue was 54 g, to obtain 459 g of ENB (2). Wa/Wd and Wb/Wd of this ENB were $3.2\times10^{-6}$ and $13\times10^{-6}$ respectively.

(Polymerization)

A 2 l stainless autoclave in which the atmosphere was fully replaced by nitrogen was charged with 884 ml of heptane from which impurities were eliminated and 16 ml of the above ENB (2) at 23° C. Next, this autoclave was charged further with 17 N-l of propylene and the mixture was heated to 80° C. where ethylene was added such that the total pressure became 0.8 MPa. Next, 0.2 mmol of triisobutylaluminum was first added forcedly in the autoclave, and then 0.1 ml (0.001 mmol) of a hexane solution containing 0.01 mmol/ml of dimethyl(t-butylamido)(tetramethyl-$\eta^5$-cyclopentadienyl)silane]titanium dichloride and 1.0 ml (0.002 mol/ml) of a toluene solution of triphenylcarbeniumtetrakis(pentafluorophenyl)borate (manufactured by Asahi Glass Company) were forcedly added in the autoclave separately. After triphenylcarbeniumtetrakis(pentafluorophenyl)borate was forcedly added, the mixture was polymerized for 20 minutes. The pressure set just after the forced addition was maintained by adding ethylene and the temperature was kept at 80° C. during polymerization. After 20 minutes, 3 ml of methanol was pressed in the autoclave by using nitrogen to stop the polymerization. As a result, 57 g of an ethylene/propylene/ENB copolymer having an ethylene content of 62 mol %, an iodine value of 23 g/100 g and an intrinsic viscosity of 3.2 dl/g was obtained.

Comparative Example 1

Ethylene, propylene and ENB were copolymerized in the same manner as in Example 1 except that as the above ENB, ENB subjected to neither alkali-contact treatment nor distillation was used in place of ENB (2) (namely, a commercially available one was used as it was). As a result, 20 g of an ethylene/propylene/ENB copolymer having an ethylene content of 54 mol %, an iodine value of 27 g/100 g and an intrinsic viscosity of 2.3 dl/g was obtained.

Comparative Example 2

(Alkali-Contact Treatment)

150 ml of ENB was mixed with 50 ml of an aqueous 0.1N NaOH. The mixture was stirred for 5 minutes, followed by separating treatment and this process was repeated three times. Next, the ENB brought into contact with aqueous NaOH was mixed with 50 ml of ion exchange water. The mixture was stirred for 5 minutes, followed by separating treatment and this process was repeated three times to obtain an alkali-contact treated ENB (3).

(Polymerization)

Ethylene, propylene and ENB-were copolymerized in the same manner as in Example 1 except that the above ENB (3) was used in place of ENB (2). As a result, 48 g of an ethylene/propylene/ENB copolymer having an ethylene content of 62 mol %, an iodine value of 24 g/100 g and a intrinsic viscosity of 3.0 dl/g was obtained.

Example 2

(Aqueous NaOH Treatment)

As a non-conjugated cyclic diene, 5-ethylidene-2-norbornene (hereinafter abbreviated as "ENB") manufactured by Sun Petrochemical Company) Lot 3K01 was used. The actual content of ENB was 99.48 wt %. Also, the compound A was contained in such an amount that Wa/Wd was $15\times10^{-6}$ and the compound B was likewise contained in such an amount that Wb/Wd was $65\times10^{-6}$. A drum having a capacity of 1000 L and equipped with a stirrer was charged with 450 L of the above ENB and 150 L of aqueous 0.1 N NaOH. The mixture was stirred for 10 minutes, was allowed to stand and then, aqueous NaOH was discharged. This operation for treating ENB was repeated three times. ENB was left in this drum, into which 150 L of ion exchange water was poured. The mixture was stirred for 10 minutes, was allowed to stand and then the water phase was discharged. This operation for treating ENB was repeated three times.

(Distillation 1)

The organic phase withdrawn in the above step (treatment with aqueous NaOH) was subjected to distillation. For the distillation, a distiller was used which was made of SUS304, had a tower diameter of 305 mm and a tower height of 13 m and was packed with IMTP packings corresponding to 30 stages. ENB Lot 3K01 was supplied at a rate of 200 kg/h, and a light fraction was withdrawn from the top of the distiller at a rate of 10 kg/h and a heavy fraction was withdrawn from the bottom of the distiller at a rate of 190 kg/h. At this time, the pressure of the tower top was reduced to 80 torr and the amount of a reflux was 80 kg/h. At this time, the temperature of the tower bottom was 88° C.

(Distillation 2)

Using the same distiller as above (distillation 1), the ENB withdrawn from the tower bottom in the above distillation (distillation 1) was supplied at a rate of 50 kg/h, and a light fraction was withdrawn from the top of the distiller at a rate of 45 kg/h and a heavy fraction was withdrawn from the bottom of the distiller at a rate of 5 kg/h. At this time, the pressure of the tower top was reduced to 84 torr and the amount of a reflux was 100 kg/h. At this time, the temperature of the tower bottom was 84° C. In the fraction (hereinafter referred to as ENB (4)) withdrawn from the tower top, the compound A was contained in such an amount that Wa/Wd was $3\times10^{-6}$ and the compound B was contained in such an amount that Wb/Wd was $5\times10^{-6}$.

(Continuous Polymerization)

ENB (4) (one obtained by eliminating a low-boiling point fraction and a high-boiling point fraction from the above ENB (4) after washing with NaOH) was used. A SUS reactor having a capacity of 300 L and equipped with a stirrer was used to run polymerization. The temperature was kept at 80° C. and the liquid level was kept such that the volume of the liquid was 100 L, to run polymerization by a continuous method.

In the reaction, (t-butylamido)dimethyl(tetramethyl-$\eta^5$-cyclopentadienyl)sila netitanium dichloride was used as a main catalyst, $(C_6H_5)_3CB(C_6F_5)_4$ was used as a co-catalyst and triisobutylaluminum (hereinafter noted as TIBA) was used as an organic aluminum compound.

The supply condition of the raw materials are as follows.

From the obtained polymer solution, a resin was obtained by steam stripping.

In the obtained resin, the content of ethylene was 62.2 mol %, the content of propylene was 30.2 mol %, the content of ENB was 7.6 mol % and ML(1+4) 100° C. was 56. The yield per hour was 6.0 kg.

Comparative Example 3

(Aqueous NaOH Treatment)

As a non-conjugated cyclic diene, 5-ethylidene-2-norbornene (hereinafter abbreviated as "ENB", manufactured by Sun Petrochemical Company) Lot 3K01 was used. The actual content of ENB was 99.48 wt %. Also, the compound A was contained in such an amount that Wa/Wd was $15\times10^{-6}$ and the compound B was likewise contained in such an amount that Wb/Wd was $65\times10^{-6}$. A drum having a capacity of 1000 L and equipped with a stirrer was charged with 450 L of the above ENB and 150 L of aqueous 0.1 N NaOH. The mixture was stirred for 10 minutes, was allowed to stand and then, aqueous NaOH was discharged. This operation for treating ENB was repeated three times. ENB was left in this drum, into which 150 L of ion exchange water was poured. The mixture was stirred for 10 minutes, was allowed to stand and then the aqueous phase was discharged. This operation for treating ENB was repeated three times.

(Molecular Sieve Treatment)

The organic phase recovered in the above process (aqueous NaOH treatment) was treated using a molecular sieve. A 50 L SUS container was packed with 50 L of a molecular sieve 4A. ENB was supplied to this container at a rate of 50 L/h to carry out molecular sieve treatment.

In this ENB, the compound A was contained in such an amount that Wa/Wd was $13\times10^{-6}$ and the compound B was contained in such an amount that Wb/Wd was $65\times10^{-6}$ (hereinafter referred to as ENB (5)).

(Continuous Polymerization 1)

ENB (5) (one obtained by treating with the molecular sieve 4A after washing with NaOH) was used. A SUS reactor having a capacity of 300 L and equipped with a stirrer was used to run polymerization. The temperature was kept at 80° C. and the liquid level was kept such that the volume of the liquid was 100 L, to run polymerization by a continuous method.

In the reaction, (t-butylamido)dimethyl(tetramethyl-$\eta^5$-cyclopentadienyl)sila netitanium dichloride was used as a main catalyst, $(C_6H_5)_3CB(C_6F_5)_4$ was used as a co-catalyst and triisobutylaluminum (hereinafter noted as TIBA) was used as an organic aluminum compound.

TABLE 9

| Hexane kg/h | Ethylene kg/h | Propylene kg/h | ENB kg/h | Hydrogen Nl/h | Main catalyst mmol/h | Co-catalyst mmol/h | TIBA mmol/h |
|---|---|---|---|---|---|---|---|
| 22.8 | 3.7 | 3.8 | 6.2 | 20 | 0.16 | 0.48 | 2.0 |

The supply condition of the raw materials are as follows.

TABLE 10

| Hexane kg/h | Ethylene kg/h | Propylene kg/h | ENB kg/h | Hydrogen Nl/h | Main catalyst mmol/h | Co-catalyst mmol/h | TIBA mmol/h |
|---|---|---|---|---|---|---|---|
| 22.8 | 3.7 | 3.8 | 6.2 | 20 | 0.28 | 0.84 | 25 |

From the obtained polymer solution, a resin was obtained by steam stripping.

In the obtained resin, the content of ethylene was 62.4 mol %, the content of propylene was 29.8 mol %, the content of ENB was 7.8 mol % and ML(1+4) 100° C. was 55. The yield per hour was 5.9 kg. It is understood that if it is intended to obtain a polymer having the same properties as in Example 2, it is necessary to make the concentration of the catalyst higher than that in Example 2.

(Continuous Polymerization 2)

ENB (5) (one obtained by treating with the molecular sieve 4A after washing with NaOH) was used.

A SUS reactor having a capacity of 300 L and equipped with a stirrer was used to run polymerization. The temperature was kept at 80° C. and the liquid level was kept such that the volume of the liquid was 100 L, to run polymerization by a continuous method.

In the reaction, (t-butylamido)dimethyl(tetramethyl-$\eta^5$-cyclopentadienyl)sila netitanium dichloride was used as a main catalyst, $(C_6H_5)_3CB(C_6F_5)_4$ was used as a co-catalyst and triisobutylaluminum (hereinafter noted as TIBA) was used as an organic aluminum compound.

The supply condition of the raw materials are as follows.

TABLE 11

| Hexane kg/h | Ethylene kg/h | Propylene kg/h | ENB kg/h | Hydrogen Nl/h | Main catalyst mmol/h | Co-catalyst mmol/h | TIBA mmol/h |
|---|---|---|---|---|---|---|---|
| 22.8 | 3.7 | 3.8 | 6.2 | 20 | 0.28 | 0.84 | 2.0 |

From the obtained polymer solution, a resin was obtained by steam stripping.

The yield of the obtained resin per hour was 2.6 kg.

It is understood that when running polymerization in the same condition as in Example 2, polymerization activity is outstandingly low.

Example 3

(Distillation 1)

As a non-conjugated cyclic polyene, 5-ethylidene-2-norbornene (hereinafter abbreviated as "ENB", manufactured by Sun Petrochemical Company) Lot 3K01 was used. The actual content of ENB was 99.48 wt%. Also, the compound A was contained in such an amount that Wa/Wd (ratio by weight) was $15 \times 10^{-6}$ and the compound B was likewise contained in such an amount that Wb/Wd (ratio by weight) was $65 \times 10^{-6}$. For the distillation, a distiller was used which was made of SUS304, had a tower diameter of 305 mm and a tower height of 13 m and was packed with IMTP packings corresponding to 30 stages. ENB Lot 3K01 was supplied at a rate of 100 kg/h, and a light fraction was withdrawn from the top of the distiller at a rate of 10 kg/h and a heavy fraction was withdrawn from the bottom of the distiller at a rate of 90 kg/h. At this time, the pressure of the tower top was reduced to 80 torr and the amount of a reflux was 100 kg/h. At this time, the temperature of the tower bottom was 88° C.

(Distillation 2)

Using the same distiller as above (distillation 1), the ENB withdrawn from the tower bottom in the above distillation (distillation 1) was supplied at a rate of 50 kg/h, and a light fraction was withdrawn from the top of the distiller, at a rate of 40 kg/h and a heavy fraction was withdrawn from the bottom of the distiller at a rate of 10 kg/h. At this time, the pressure of the tower top was reduced to 84 torr and the amount of a reflux was 120 kg/h. At this time, the temperature of the tower bottom was 84° C. In the fraction (hereinafter referred to as ENB (6)) withdrawn from the tower top, the compound A was contained in such an amount that Wa/Wd (ratio by weight) was less than $2 \times 10^{-6}$ and the compound B was contained in such an amount that Wb/Wd (ratio by weight) was less than $2 \times 10^{-6}$.

(Polymerization)

A 2 l stainless autoclave in which the atmosphere was fully replaced by nitrogen was charged with 884 ml of heptane from which impurities were eliminated and 16 ml of the above ENB (6) at 23° C. Next, this autoclave was charged further with 17 N-l of propylene and the mixture was heated to 80° C. where ethylene was added such that the total pressure became 0.8 MPa. Next, 0.2 mmol of triisobutylaluminum was added forcedly in the autoclave, and then 0.1 ml (0.001 mmol) of a hexane solution containing 0.01 mmol/ml of [dimethyl(t-butylamido)(tetramethyl-$\eta^5$-cyclopentadienyl)silane]titanium dichloride and 1.0 ml (0.002 mol/ml) of a toluene solution of triphenylcarbeniumtetrakis (pentafluorophenyl)borate (manufactured by Asahi Glass Company) were forcedly added in the autoclave separately. After triphenylcarbeniumtetrakis(pentafluorophenyl)borate was forcedly added, the mixture was polymerized for 20 minutes. The pressure set just after the forced addition was maintained by adding ethylene and the temperature was kept at 80° C. during polymerization. After 20 minutes, 3 ml of methanol was pressed in the autoclave by using nitrogen to stop the polymerization. As a result, 55 g of an ethylene/propylene/ENB copolymer having an ethylene content of 63 mol %, an iodine value of 23 g/100 g and a intrinsic viscosity of 3.1 dl/g was obtained.

Comparative Example 4

Ethylene, propylene and ENB were copolymerized in the same manner as in Example 1 except that ENB obtained from the market (ENB manufactured by Sun Petrochemical Company, Lot 3K01) was used as it was in place of the above ENB (6). As a result, 30 g of an ethylene/propylene/ENB copolymer having an ethylene content of 57 mol %, an iodine value of 26 g/100 g and an intrinsic viscosity of 2.7 dl/g was obtained.

Example 4

(Aqueous NaOH Treatment)

As a non-conjugated cyclic diene, 5-ethylidene-2-norbornene (hereinafter abbreviated as "ENB") manufactured by Sun Petrochemical Company) Lot 3K02 was used. The compound A was contained in such an amount that Wa/Wd was $10.5 \times 10^{-6}$ and the compound B was likewise contained in such an amount that Wb/Wd was $115 \times 10^{-6}$.

150 ml of ENB was mixed with 50 ml of an aqueous 0.1N NaOH. The mixture was stirred for 5 minutes, followed by separating treatment and this process was repeated three times. Next, the ENB brought into contact with aqueous NaOH was mixed with 50 ml of ion exchange water. The mixture was stirred for 5 minutes, followed by separating treatment and this operation was repeated three times to obtain alkali-contact treated ENB. This process was repeated three times to obtain a total of 430 ml of alkali-contact treated ENB (7).

(Distillation)

On the day following the day on which the above aqueous NaOH treatment was carried out, ENB (7) was distilled as mentioned below, using an Oldersho 15-stage batch system distiller. 270 g of the above ENB (7) was charged to the distiller to start heating under the condition of a top pressure of 10.6 kPa. First, ENB (7) was distilled under a reflux ratio (rr) of 10 to discharge 27 g of the fraction. Then, the rr was changed to 3 to continue distillation until the amount of the residue was 54 g, to obtain 189 g of ENB (8). Wa/Wd and Wb/Wd of this ENB were $2.9 \times 10^{-6}$ and $9 \times 10^{-6}$ respectively.

(Preparation of the ENB Composition)

Immediately after that, 50 g of this ENB (8) was placed into a 100-ml flask with branch which had been purged with nitrogen and into which 5.0 mg of 2,6-di-tert-buthyl-methylphenol and a rotor had been put. Immediately after ENB (8) was placed into the flask, the contents were agitated with a stirrer for 30 minutes, and the ENB composition (9) was obtained.

(Polymerization 1)

Ethylene, propylene and ENB were copolymerized in the same manner as in Example 1 except that the above ENB composition (9) which had been allowed to stand for one day after the preparation of the composition was used in place of ENB (2). As a result, 57 g of an ethylene/propylene/ENB copolymer having an ethylene content of 64 mol %, an iodine value of 23 g/100 g and an intrinsic viscosity of 3.2 dl/g was obtained.

(Polymerization 2)

Ethylene, propylene and ENB were copolymerized in the same manner as in Example 1 except that the above ENB composition (9) which had been allowed to stand for 140 days after the preparation of the composition was used in place of ENB (2). As a result, 57 g of an ethylene/propylene/ENB copolymer having an ethylene content of 63 mol %, an iodine value of 23 g/100 g and an intrinsic viscosity of 3.2 dl/g was obtained.

What is claimed is:

1. A non-conjugated cyclic diene selected from the group consisting of bicyclo[2.2.1]hept-2-ene derivatives having an alkylidene group and bicyclo[2.2.1]hept-2-ene derivatives having an alkenyl group characterized in that it satisfies at least one of the following (1) and (2):
   (1) it contains a compound (A) having a seven-membered cyclic triene hydrocarbon structure in such an amount that the ratio (Wa/Wb) of the weight (Wa) of the compound (A) to the weight (Wd) of a non-conjugated cyclic diene is 0 or more and $5 \times 10^{-6}$ or less; and
   (2) it contains a conjugated polyene compound (B) having an eight-membered bicyclic hydrocarbon structure in such an amount that the ratio (Wb/Wd) of the weight (Wb) of the compound (B) to the weight (Wd) of a non-conjugated cyclic diene is 0 or more and $30 \times 10^{-6}$ or less.

2. A non-conjugated cyclic diene composition comprising the non-conjugated cyclic diene according to claim 1 and an antioxidant.

3. A method of producing a polymer based on non-conjugated cyclic diene comprising supplying the non-conjugated cyclic diene according to claim 1 to the polymerization or copolymerization using an olefin polymerization catalyst containing an organic aluminum oxy compound and/or an ionizing ionic compound.

4. A method of producing a polymer based on non-conjugated cyclic diene comprising supplying the non-conjugated cyclic diene according to claim 2 to the polymerization or copolymerization using an olefin polymerization catalyst containing an organic aluminum oxy compound and/or an ionizing ionic compound.

5. A method of producing a polymer based on non-conjugated cyclic diene comprising supplying a non-conjugated cyclic diene selected from the group consisting of bicyclo[2.2.1]hept-2-ene derivatives having an alkylidene group and bicyclo[2.2.1]hept-2-ene derivatives having an alkenyl group which is obtained by bringing a crude non-conjugated cyclic diene into contact with an alkali and then removing at least a part of a low-boiling point fraction which is components distilled from the top of a tower before a main fraction and at least a part of a high-boiling point fraction which is components left non-distilled in a tower after the main fraction is distilled to the polymerization or copolymerization using an olefin polymerization catalyst containing an organic aluminum oxy compound and/or an ionizing ionic compound.

6. A method of producing a non-conjugated cyclic diene polymer comprising supplying a non-conjugated cyclic diene composition containing a non-conjugated cyclic diene which is obtained by bringing a crude non-conjugated cyclic diene selected from the group consisting of bicyclo[2.2.1]hept-2-ene derivatives having an alkylidene group and bicyclo[2.2.1]hept-2-ene derivatives having an alkenyl group into contact with an alkali and then removing at least a part of a low-boiling point fraction which is components distilled from the top of a tower before main fraction and at least a part of a high-boiling point fraction which is components left non-distilled in a tower after main fraction is distilled and an antioxidant to the polymerization or copolymerization using an olefin polymerization catalyst containing an organic aluminum oxy compound and/or an ionizing ionic compound.

* * * * *

UNITED STATES PATENT AND TRADEMARK OFFICE
CERTIFICATE OF CORRECTION

PATENT NO.       : 7,141,631 B2
APPLICATION NO.  : 10/980283
DATED            : November 28, 2006
INVENTOR(S)      : Toshio Murakami et al.

Page 1 of 1

It is certified that error appears in the above-identified patent and that said Letters Patent is hereby corrected as shown below:

Claim 1, Column 26, line 12, change "(Wa/Wb)" to --(Wa/Wd)--.

Signed and Sealed this

Twenty-ninth Day of July, 2008

JON W. DUDAS
*Director of the United States Patent and Trademark Office*